Oct. 9, 1973 F. O. BLEY 3,764,441

LAMINATOR

Filed May 26, 1970

INVENTOR.
FREDERICK O. BLEY

BY
Robert R. Priddy
ATTORNEY

United States Patent Office 3,764,441
Patented Oct. 9, 1973

3,764,441
LAMINATOR
Frederick O. Bley, Reston, Va., assignor to Optical and Electronic Research, Inc., Reston, Va.
Filed May 26, 1970, Ser. No. 40,517
Int. Cl. B32b 31/08, 31/20
U.S. Cl. 156—555      3 Claims

ABSTRACT OF THE DISCLOSURE

A laminator is disclosed which is designed to allow an object to be laminated between two sheets of transparent material. The laminator is provided with a pair of supply rolls, each designed to supply one sheet of transparent material. A pair of guide rollers are provided to guide the transparent material in its path through the laminator. A pair of heat drums are provided, with stationary heating elements, to heat the transparent material to a temperature at which it is capable of being fused with another sheet of transparent material to form a unitary structure. A pair of pressure rollers formed of silicone rubber provides pressure to cause the transparent material to fuse. A second pair of silicone rubber pressure rollers, one of which is driven, draws the laminated combination over a cooling fan and subsequently ejects the now unitary structure from the laminator. One pressure roller, of the first pair, is capable of limited movement to facilitate loading the laminator. An adjustable thermostat is provided to indicate when the heating elements have been raised to operating temperature and to provide proper operating temperature for laminate material of varying thickness. The heating elements per se are stationary, however, a rotatable shield is provided to minimize friction between the laminate material and the heating device as the laminate material passes by the heat source.

BACKGROUND OF THE INVENTION

Lamination, as carried out by the present invention is particularly useful to procet objects which are expected to be subjected to constant handling. The lamination provides a protective coating of a transparent material which protects the object from deterioration due to handling while at the same time allowing unrestricted visibility of the object. Objects which it has been found particularly useful to laminate include I.D. cards, drivers licenses, Social Security cards, and a variety of other indicia which are designed to be permanent but which are subject to frequent handling.

The prior art has supplied a plurality of laminating devices which are designed to aid in the laminating process. These devices usually include supply rolls to supply laminate material in roll form, heating means to heat the laminate material to a temperature at which it is capable of fusing, and a variety of devices to cause the laminate material to be driven through the laminating device. However, the prior art solutions to a number of problems in the field of laminating devices have proved deficient from a number of aspects. The present invention seeks to overcome these deficiencies and provide a laminator which is simple to use, portable, reasonable in cost, and capable of use over an extended period of time without requiring replacement of parts.

The prior art laminating devices, in common with the laminator of the present invention, employ pressure rollers to impart motion to the laminate material to cause it to move through the laminating machine. However, the majority of prior art laminating devices employ pressure rollers of neoprene. The use of neoprene as a pressure roller has caused a number of difficulties. In the first place neoprene is subject to deterioration from heat. As a consequence of the need to heat the laminate material to cause it to fuse, the pressure rollers are inherently subject to heating from the laminate material which they drive. The neoprene pressure rollers of the prior art laminators therefore, over a period of use, lose their resiliency due to the heat to which they are subjected. A further problem with the use of neoprene is that after a sufficient amount of use it takes a permanent set which also causes it to lose its resiliency. A further difficulty with neoprene is that to achieve a smooth surface neoprene must be ground. This is a troublesome operation and it is difficult to grind neoprene to close tolerances to ensure it is reasonably round. These difficulties are eliminated with the use of silicone rubber. These factors, deterioration from heat, loss of resiliency from extended pressure, and difficulty of manufacture have caused the prior art neoprene rollers to wear out at an extremely rapid rate and to be costly to replace.

In addition, a majority of the prior art devices thought it necessary to use rotating heating elements to supply heat to the laminate material. If rotating heat drums are not used the resultant friction between stationary heated surfaces and the laminate causes stretching and scratching of the laminate material with resultant defects in the end product. The disadvantages of using rotating heating elements was the requirement in said device for a commutator or like device to transfer electrical heating current from the power source to the heating element. Due to the high temperature environment in which these commutators were forced to operate, arcing and corrosion were problems which caused rapid deterioration of the commutator.

Inasmuch as the pressure rollers of the prior art, and of the present invention, impart their driving motion to the laminate material through pressure it is difficult to thread the laminate material, prior to operation, when the pressure rollers are in operative engagement. This is complicated by the fact that the laminate material is extremely flexible and therefore difficult to force between pressure rollers when in operative engagement. Further, if the laminate material is not threaded properly, that is in a direction perpendicular to the axis of the pressure rollers, a large amount of laminate material will be wasted. This is as a consequence of the fact that if the laminate material is not moving substantially perpendicular to the axis of rotation of the pressure rollers the two sheets of laminate material will not exactly correspond in the end product. The misregistration of laminate obviously causes waste and until the misalignment between laminate material and pressure roller axis can be corrected the laminator output is defective.

It is therefore one object of the present invention to provide a laminator which overcomes the disadvantages caused by the use of neoprene as a pressure roller.

It is another object of the present invention to provide a laminator which eliminates the disadvantages occasioned by the necessity for commutators in the heating element circuit.

It is another object of the present invention to provide a laminator in which loading is facilitated so that the laminate material is accurately registered prior to initiating operation of the laminator.

It is a further object of the present invention to provide an adjustable thermostat in the heating circuit to provide for laminating material of varying thickness.

It is a further object to provide a laminator which meets the foregoing criteria and is still lightweight and portable and resonable in cost.

BRIEF DESCRIPTION OF THE INVENTION

The present invention overcomes these and other deficiencies in the prior art by providing a laminator in which the pressure rollers are made of silicone rubber, employs stationary heat elements to eliminate the necessity for commutators and provides at least one movable pressure roller to facilitate proper loading of the laminator.

The pressure rollers in the laminator disclosed herein are formed of silicone rubber which, in contrast to the neoprene pressure rollers of the prior art, can withstand the high temperatures that are encountered in the operation of the laminator. Further the silicone pressure rollers employed in the laminator of the present invention maintain their resiliency under the constant pressure to which they are subjected in contrast to the neoprene rollers which take a permanent set. Both these factors result in pressure rollers which have a considerably longer lifetime than the pressure rollers employed in the prior art. This factor, naturally, contributes to the longer lifetime of the laminator disclosed herein.

The laminator of the present invention provides rotatable heat drums which avoid the problems presented in the prior art caused by stationary heating devices, of stretching and scratching of the laminate material. At the same time the heating device employed in the present invention uses stationary heating elements and thus obviates the need for a commutator. The absence of a commutator in the laminator of the present invention, of course, obivates the necessity to continually replace deteriorated commutators found in the prior art.

The laminator of the present invention further provides at least one pressure roller which is movable to facilitate proper and accurate loading of the laminate material prior to operation. By providing a movable pressure roller accurate registration of laminate material in the loading process is facilitated. Prior to loading the laminator the movable pressure roller is moved out of operative engagement allowing relatively free access allowing the operator to move one sheet of laminate material with respect to the other until they are in accurate registration with each other. At this time the pressure roller is moved back into operative engagement thus ensuring accurate registration of the laminate material prior to initiating operation. In addition, a pair of guide rollers are provided to further ensure accurate registration of the laminate material as it enters the pressure roller section.

DETAILED DESCRIPTION OF THE DRAWINGS

Figure 1:
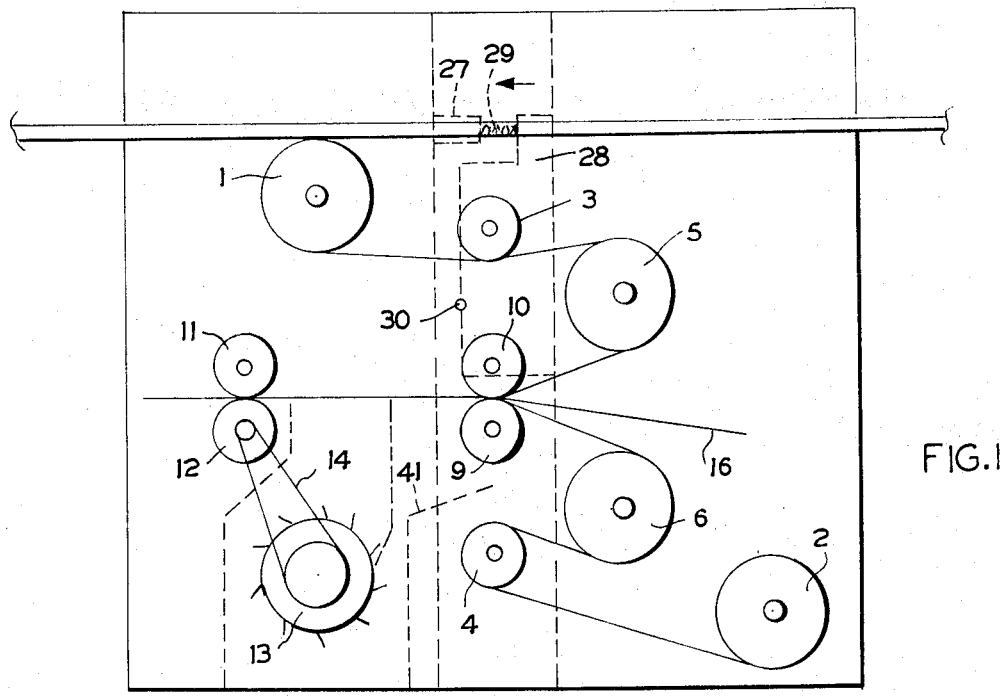
FIG. 1 is a schematic representation of the laminator of the present invention.

In FIG. 1, reels 1 and 2 are respectively top supply and bottom supply reels. Both supply reels are rotatably mounted in the laminator shell. The torque required to cause each of reels 1 and 2 to turn is adjustable in order to provide for variable tension in the laminate material. This adapts the laminator for use with a wide variety of laminate materials which require different tensioning to operate properly. Rollers 3 and 4 are, respectively, top and bottom guide rollers. These are rotatably mounted in the laminator shell and are designed to guide the laminate material in its path between top or bottom supply rolls and top or bottom heat drums in order to provide accurate registration when the two sheets of laminate material meets at the pressure rollers. The guide rollers, 3 and 4, are further positioned so as to cause the laminate material to wrap around a major portion of heat drums 5 and 6 respectively. Both top heat drum 5 and bottom heat drum 6 are fixedly mounted in the laminator shell.

Figure 2:
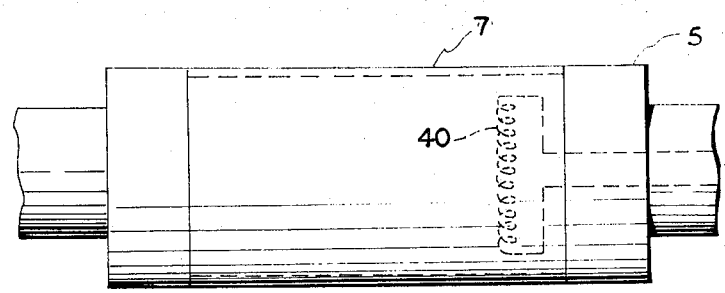
FIG. 2 is a cross-section view of the stationary heat drum used in the laminator of the present invention.

FIG. 2 shows in more detail the stationary heat drum, and the means by which heat is transferred from the stationary heat drum to the moving laminate material. In particular stationary heat drum 5, which is cylindrical in form, is provided with a cylindrical shield 7. Cylindrical shield 7 can be either aluminum or other material which may be coated with Teflon to minimize friction. Although heat drum 5 is fixedly mounted in the laminator shell so that heating element 40 is stationary, cylindrical shield 7 is rotatably mounted on heat drum 5 and rotates around the axis of heat drum 5 as the laminate material moves by. As can be seen in FIG. 1 the laminate material, in its path around either heat drum 5 or 6, wraps around a major portion of the periphery. During the time the laminate material is in contact with the rotatable cylindrical shield 7 heat is transferred from the heat drum to the laminate material to raise its temperature. The rotation of cylindrical shield 7, as the laminate material moves across the heat drum, minimizes stretching or scratching of the laminate material which would be caused by moving it along a stationary surface.

After leaving the periphery of heat drums 5 or 6 the laminate material is brought together by pressure rollers 9 and 10. Prior to the time pressure rollers 9 and 10 cause a fusing of the separate laminate sheets an object is introduced between the sheets from feed tray 16. Rollers 9 and 10 are formed of silicone rubber and each ar rotatably mounted. While roller 9 rotates about a fixed axis, roller 10 is capable of moving out of operative engagement with roller 9.

To this end movable pressure roller 10 is mounted on rotatable member 28. Rotatable member 28 is capable of limited rotation about the axis of guide roller 3, and its motion is limited by stop 30. Operatively engaged with movable member 28 is spring means 29 and bar 27. It will be noted that the direction of motion of movable member 28 (shown by the arrow), and therefore pressure roller 10, is such that when in operative position stop 30 provides for positive pressure between pressure rollers 9 and 10.

In operative position rollers 9 and 10 are spaced to exert pressure on the laminate material so that, when the laminate material is at proper temperature, it will fuse. Motor 13 drives a fan which serves to cool the now laminated, but still hot, structure subsequent to its passage through pressure rollers 9 and 10. Motor 13, through timing belt drive 14, drives pressure roller 12. Pressure rollers 11 and 12 are similar to pressure rollers 9 and 10 in that each are mounted for rotatable movement and are formed of silicone rubber. Driven pressure roll 12 exerts driving force to the laminate material through the action of pressure roller 11.

A portion of the housing for motor 13 forms shield 41 which serves to facilitate threading the laminate material around lower guide roller 4.

Figure 3:
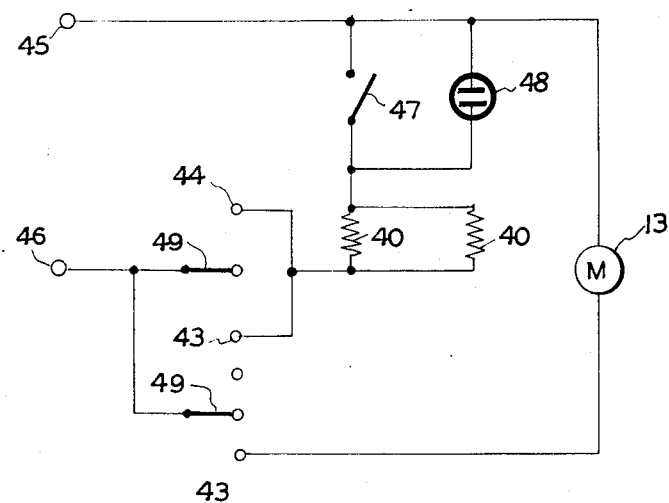
FIG. 3 is a schematic of the electrical circuit used in the laminator of the present invention.

FIG. 3 is a wiring diagram for the laminator of the present invention. Connected through conventional power source terminals 45 and 46 is a three position switch 49. As shown, switch 49 is in its off position at which time no power is applied to the laminator. In position 44, the preheat position, power is applied through switch 49 to the heaters 40 and then through the parallel combination of thermostat 47 and neon lamp 48. Thermostat 47 is adjustable to provide a variable operating temperature which is necessary to enable the laminator to operate with laminate material of varying thickness. Thermostat 47 is normally closed and only opens when it senses the heaters 40 have reached the operating temperature for which thermostat 47 has been set. With thermostat 47 open, a circuit is completed through neon lamp 48 to indicate that the laminator heating device has reached operating temperature. The third or transport position, of three position switch 49, in addition to providing the heating circuit previously described also provides a circuit through motor 13. Energization of motor 13 provides driving power for the laminate material through driven pressure roller 12 in cooperation with pressure roller 11 and further provides cooling for the completed laminated combination through the fan driven by motor 13.

OPERATION

Prior to operating the laminator it is first necessary to thread the laminate material from top supply reel 1 and bottom supply reel 2 across top and bottom guide rollers 3 and 4, around heat drums 5 and 6, through pressure rollers 9 and 10, and driven pressure rollers 11 and 12. As an aid to threading the laminate material from bottom supply reel 2, shield 41 guides the laminate material around bottom guide roller 4. In order to thread the laminate material through non-driven pressure rollers 9 and 10 it is necessary to compress spring 29 by applying force to movable member 28 at its upper portion. This causes pressure roller 10 to rotate slightly about the pivot point of movable member 28 which is the axis of upper guide roller 3. This allows laminate material to be fed past the opening between pressure rollers 9 and 10. With pressure rollers 9 and 10 in their non-operative position, or position for threading, the operator can easily adjust the registration of material from top and bottom supply reels so that the edges of this material match. Sufficient laminate material is fed past pressure rollers 9 and 10, while separated, to bring the laminate material up to pressure roller 11 and driven pressure roller 12. At this time spring 29 is released so that movable member 28 abuts stop 30 and brings pressure roller 10 into operative engagement with pressure roller 9. Energization of three position switch 49 to the transport position will energize motor 13 and cause driven pressure roller 12 in cooperation with pressure roller 11 to begin driving the laminate material. At this point it should be noted that movable member 28, and accordingly pressure roller 10, are movable in a direction opposite the direction of motion of laminate material. This ensures that pressure rollers 9 and 10 act against positive stop 30 and not against spring 29 which would result in uneven pressure exerted between rollers 9 and 10.

Prior to operating the laminator it is necessary to raise heat drums 5 and 6 to operating temperature. This is accomplished by positioning the three position switch 49 in its preheat position 44. When the temperature of heat drums 5 and 6 have been raised to an operating point, as determined by adjustable thermostat 47, neon 48 is energized. At this point the laminator is ready to operate.

Three position switch 49 is then moved to its transport position, 43, which, in addition to energizing motor 13 to drive the pressure rollers also supplies current to the heating elements 40 so as to enable heat drums 5 and 6 to remain at operating temperature. As driven pressure roller 12 rotates it frictionally engages and drives the laminate material through the action of non-driven pressure roller 11. This establishes the feeding force for both top and bottom supply reels 1 and 2. This force acting against the adjustable tension of reels 1 and 2 results in an adjustable tension for the laminate material during the laminating operation. The laminate material coming off the supply rolls passes over one or the other of guide rollers 3 or 4. Through the action of guide rollers 3 and 4 the laminate material is properly aligned for lamination without waste. The relationship of guide rollers 3 and 4 with heat drums 5 and 6 causes the laminate material to wrap around a major portion of one or the other of heat drums 5 and 6. Although the heat drums 5 and 6 are non-rotatably mounted the cylindrical shield 7 on heat drum 5, and a similar shield (not shown) on heat drum 6 are rotatable on their respective heat drums. The shields 7 serve to transmit the heat from each heat drum to the laminate material to enable the latter to fuse under the pressure of pressure rollers 9 and 10. In addition, the rotation of shields 7 reduces the frictional forces to which the laminate material is subjected thus minimizing or eliminating stretching or scratching of this material. The material to be laminated is placed on feed tray 16 and manually fed into the laminator with the now heated top and bottom sheets of laminate material. Pressure rollers 9 and 10 fuse the laminate material with the object to be laminated therebetween. The now laminated combination of lower laminate material, the object to be laminated, and the upper laminate material now passes over cooling air supplied by the fan driven by motor 13. The now cooled and laminated finished product is driven through pressure rollers 11 and 12 by the action of the frictional driving force exerted by pressure roller 12 acting in cooperation with pressure roller 11.

The laminator of the present invention thus serves to overcome a plurality of difficulties associated with prior art laminators. On the one hand the laminator of the present invention provides pressure rollers 9, 10, 11 and 12 which are made of silicone rubber. As explained above the silicone pressure rollers have the advantage, over the previousy used neoprene, of withstanding the high temperatures involved in the operation of the laminating machinery and further maintain their resiliency which is required for proper operation. The laminator of the present invention further provides a stationary heat drum which obviates the necessity for a commutator while at the same time providing rotatable cylindrical shields on the stationary heat drum which minimizes stretching or scratching of the laminate material which otherwise would occur were the laminate material drawn past the stationary surface. Furthermore the laminator of the present invention is provided with a movable pressure roller 10 which enables the operator to thread the laminator, prior to operation, so as to achieve accurate registration of top and bottom sheets of laminate material. The timing belt 14 employed to drive pressure roller 12 possesses the advantages of a gear or chain drive, in the positive driving action, while at the same time possessing the advantages of belt drive, quiet operation.

What is claimed is:

1. A laminator, including laminate material supply means, laminate material heating means, and a plurality of pressure rollers, at least one of said pressure rollers being movable out of its operable position to facilitate loading said laminate material, means carrying said movable pressure roller, said carrying means being mounted for limited rotational movement in a direction opposite to the direction of movement of laminate material through said pressure rollers.

2. The laminator of claim 1 which further includes spring means urging said carrying means into its operative position, and fixedly mounted stop means abutting said carrying means when movable pressure roller is in its operative position.

3. A laminator including a frame in which is mounted a first material supply means adapted to supply a sheet of laminate material from a roll, said first supply means defining the beginning of a first material flow path which extends through said laminator to a laminated material outlet, a second material supply means mounted in said frame and adapted to supply a sheet of laminate material from a roll, said second supply means defining the beginning of a second material flow path which extends through said laminator to a laminated material outlet, said first and second material flow paths including separate portions, in which said flow paths are separate and spaced apart from one another and engaged portions in which said sheets of laminate material are in face to face contact with one another, first and second stationary heat drums mounted in said frame, a rotatable heat shield rotatably mounted on each of said stationary heat drums, said heat shields and heat drums being so positioned so that the major portion of the periphery of each heat shield is traversed and contacted by one of the sheets along the separate portions of said first and second material flow paths, and a first pair of pressure rollers which are mounted in said frame separate from said rotatable heat shields and which are spaced from said heat shields along said material flow paths in the direction of movement of said laminate material along said flow paths, said pressure rollers defining the starting point of the engaged portions of said flow paths and being adapted to fuse the sheets of laminated material which have been heated by contact with said rotatable heat shields, movable support means carrying at least one of said first pair of pressure rollers, said movable support means being mounted on said frame for rotational movement in the direction opposite the direction of movement of laminate material through said first pair of pressure rollers.

References Cited
UNITED STATES PATENTS

| | | | |
|---|---|---|---|
| 3,309,983 | 3/1967 | Dresser | 156—555 X |
| 3,484,325 | 12/1969 | Pendleton | 156—582 |
| 3,027,285 | 3/1962 | Eisner et al. | 156—555 X |
| 3,367,225 | 2/1968 | Stanford et al. | 156—549 X |
| 3,453,169 | 7/1969 | Buck et al. | 156—555 X |
| 3,623,933 | 11/1971 | Staats | 156—555 X |

BENJAMIN A. BORCHELT, Primary Examiner

J. M. HANLEY, Assistant Examiner

U.S. Cl. X.R.

156—852, 552